United States Patent
Castro et al.

(10) Patent No.: US 11,824,440 B2
(45) Date of Patent: Nov. 21, 2023

(54) POWER CONVERTER POWER FACTOR CONTROL

(71) Applicant: Hamilton Sundstrand Corporation, Charlotte, NC (US)

(72) Inventors: Ignacio Castro, Gijón (ES); Ponggorn Kulsangcharoen, Solihull (GB); Rodrigo Fernandez-Mattos, Solihull (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/806,722

(22) Filed: Jun. 13, 2022

(65) Prior Publication Data
US 2022/0399807 A1     Dec. 15, 2022

(30) Foreign Application Priority Data

Jun. 14, 2021     (EP) ..................... 21275080

(51) Int. Cl.
*H02M 1/42*     (2007.01)
*H02M 1/12*     (2006.01)
*H02M 1/44*     (2007.01)

(52) U.S. Cl.
CPC ......... *H02M 1/4208* (2013.01); *H02M 1/126* (2013.01); *H02M 1/44* (2013.01)

(58) Field of Classification Search
CPC ...... H02M 1/4208; H02M 1/126; H02M 1/42; H02M 1/44; H02M 1/00; H02M 1/0012; H02M 3/157
See application file for complete search history.

(56) References Cited

U.S. PATENT DOCUMENTS

| | | |
|---|---|---|
| 8,600,329 B1 | 12/2013 | Comeau et al. |
| 9,059,768 B1 | 6/2015 | Sorsby et al. |
| 9,431,997 B1 | 8/2016 | Comeau et al. |
| 10,862,332 B2 | 12/2020 | Jin et al. |
| 2022/0399806 A1* | 12/2022 | Castro ................. H02M 1/4225 |

OTHER PUBLICATIONS

European Search Report cited during prosecution of corresponding European Patent Application No. 21275080.6, dated Nov. 15, 2021. (11 pages).
Konstantin P Louganski et al: "Reactive Power Control Realizations in Single-Phase Active-Front-End Converters", Applied Power Electronics Conference, APEC 2007—Twenty Second Annual IEEE, IEEE, PI, Feb. 1, 2007 (Feb. 1, 2007), pp. 797-803, XP031085302, ISBN: 978-1-4244-0713-2.

(Continued)

*Primary Examiner* — Adolf D Berhane
(74) *Attorney, Agent, or Firm* — Locke Lord LLP; Gabrielle L. Gelozin

(57) ABSTRACT

A power factor correction circuit comprising: a global voltage input; and means for deriving a reference current from the global voltage; whereby the means for deriving the reference current comprises a digital leading phase admittance cancellation, DLPAC, transfer function and a filter, whereby the reference current is derived from a sum of an output of the DLPAC transfer function and an output of the filter, and further comprising means for compensating for delays in the DLPAC function.

8 Claims, 3 Drawing Sheets

(56) References Cited

OTHER PUBLICATIONS

Konstantin P Louganski et al: "A 20-KW, 10-kHz, Single-Phase Multilevel Active-Front-End Converter with Reactive Power Control", The 2006 IEEE Industry Applications Conference Fortyfirst IAS Annual Meeting, Conference Record of, IEEE, Piscataway, NJ, US, Oct. 1, 2006 (Oct. 1, 2006), pp. 576 682, XP031026088, ISBN: 978-1-4244-0364-6.

Konstantin P Louganski et al: "Current Phase Lead Compensation in Single-Phase PFC Boost Converters With a Reduced Switching Frequency to Line Frequency Ratio", IEEE Transactions on Power Electronics, Institute of Electrical and Electronics Engineers, USA, vol. 22, No. 1, Jan. 1, 2007 (Jan. 1, 2007), pp. 113-119, XP011154540, ISSN: 0885-8993, DOI: 10.1109/TPEL.2006.886656.

Lu Minghui et al: "A comparative benchmark of digital delay compensation techniques based on a graphical approach", 2017 IEEE Energy Conversion Congress and Exposition (ECCE), IEEE, Oct. 1, 2017 (Oct. 1, 2017), pp. 3044-3048, XP033247252, DOI: 10.1109/ECCE.2017.8096557 [retrieved on Nov. 3, 2017].

Kong Le et al: "Development of a Two-Level VSC Based DC Impedance Measurement Unit", 2020 IEEE Energy Conversion Congress and Exposition (ECCE), IEEE, Oct. 11, 2020 (Oct. 11, 2020), pp. 2939-2944, XP033850651, DOI: 10.1109/ECCE44975.2020.9235643 [retrieved on Oct. 21, 2020].

Rodriguez Jose et al: "Predictive Control of Power Converters and Electrical Drives" In: "Predictive Control of Power Converters and Electrical Drives", Apr. 30, 2012 (Apr. 30, 2012), John Wiley & Sons, XP055857940, ISBN: 978-1-119 94264-1 Retrieved from the Internet: URL:https://www.wiley.com/en-nl/Predictive+Control+of+Power+Converters+and +Electrical+Drivesp-9781119942641.

St Ephane Bibian et al: "Time Delay Compensation of Digital Control for DC Switchmode Power Supplies Using Prediction Techniques", IEEE Transactions on Power Electronics, Institute of Electrical and Electronics Engineers, USA, vol. 15, No. 5, Sep. 1, 2000 (Sep. 1, 2000), XP011043468, ISSN: 0885-8993.

* cited by examiner

POWER CONVERTER POWER FACTOR CONTROL

CROSS-REFERENCE TO RELATED APPLICATIONS

This application claims priority to and the benefit of European Patent Application No. 21275080.6, filed Jun. 14, 2021, the entire content of which is incorporated herein by reference.

TECHNICAL FIELD

The present disclosure relates to modifying the power factor control of a power converter.

BACKGROUND

Many electronic or electrical loads operate using a constant voltage direct current, DC, power but the power source is an AC power source. The AC power therefore has to be converted to DC. This may be done in various ways as known in the art using passive or active conversion. Conventionally, a power converter may be used including a rectifier, a low pass filter and an EMI filter. Conventional power converters often include a current control loop to shape the AC current so as to provide power factor correction (i.e. a power factor correction (PFC) loop), and to therefore improve efficiency of power conversion, and a voltage loop that maintains the DC output voltage at the required level.

It is necessary that the bandwidth of the PFC circuit is high enough to pass all significant harmonics of the rectified input sine wave. The bandwidth, however, may not be more than ⅕ of the switching frequency to avoid zero-crossing distortion. Conventional PFC designs use multiplier-based control whereby the input voltage is sensed and the current is forced to follow the sensed reference. These methods work well for low-frequency grids (e.g. 50-60 Hz) and low power applications. These designs, however, are not suitable for high-frequency grids and high power applications, e.g. for use in aircraft where systems may use frequencies in the range of 360 Hz to 800 Hz. For such frequencies, to satisfy the above bandwidth criteria, the switching frequency would have to be increased much higher than that of the PFC for 50-60 Hz grid interface applications. The switching frequency would need to be hundreds of times the fundamental frequency. For some applications, this is impossible due to switching losses. To address the shortcomings of conventional PFC designs for higher grid frequency applications, a modified PFC has been proposed known as LPAC—Leading phase admittance cancellation. The LPAC method of power factor correction is described in K. P. Louganski and J. Lai, 'Current Phase Lead Compensation in Single-Phase PFC Boost Converters with a Reduced Switching Frequency to Line Frequency Ratio'; IEEE Transactions on Power Electronics, vol. 22, no. 1, pp. 113-119, January 2007, doi: 10.1109/TPEL.2006.886656. In summary, the LPAC method makes use of the fact that the admittance of the current control circuit has two admittance components that contribute to phase lag in the system. To eliminate the current phase lead and resulting zero crossing distortion, the effect of the component $Y_1(s)$, the closed loop voltage-to-current transfer function, needs to be compensated. In conventional systems, this has been done by adding components to the circuit that create a corrective transfer function. The LPAC method, in contrast, adds a third admittance component $Y_3(s)$, that cancels the effect of the $Y_1(s)$ component. The LPAC method has been proved to provide much improved PFC at higher frequency ranges such as those used in aircraft.

There is a need to reduce the weight and size and complexity of power converters with power factor correction, particularly in applications such as aircraft whilst maintaining stability and efficiency and reliability over a wide range of operating frequencies and loading power. There is also a need to take into account time delays introduced in digital control systems.

SUMMARY

The present disclosure makes use of the ability to control a power factor corrector in a digital system, using digital LPAC, DLPAC, to modify the PFC input impedance at certain frequencies to improve stability and eliminate damping components that would otherwise negatively impact weight, volume and temperature of the components, and thus negatively impact the ability of the power converter to achieve high power density and to further introduce compensation for delays introduced by the digital control.

Stability of a control loop is ensured if Middlebrook's stability criterion is satisfied: In summary, the Middlebrook criterion can be stated as: A system will be locally stable if the magnitude of the input Impedance of the load subsystem is larger than the magnitude of the output impedance of source subsystem.

By modifying the input impedance, a stable system can be provided for power factor correction at high line frequencies and without the additional of damping components that would increase the size and weight of the system.

Only incorporating a filter is effective for analog solutions but not for digital control, because of delays in the system, Therefore, in this disclosure a delay compensation is also incorporated into the modification of the impedance.

According to this disclosure, there is provided a power factor correction circuit comprising: a global voltage input; and means for deriving a reference current from the global voltage; whereby the means for deriving the reference current comprises a digital leading phase admittance cancellation, DLPAC, transfer function and a filter, whereby the reference current is derived from a sum of an output of the DLPAC transfer function and an output of the filter, and further comprising means for compensating for delays in the DLPAC function.

Also provided is a method of correcting a power factor in a power converter, the method comprising performing a digital leading phase admittance cancellation, DLPAC, function on a global voltage input and performing a filter function on the global voltage input, and deriving a reference current resulting from the sum of the DLPAC function and the filter function, and further comprising compensating for time delays in the DLPAC function.

BRIEF DESCRIPTION OF THE DRAWINGS

Preferred embodiments will now be described by way of example only, with reference to the drawings.

DETAILED DESCRIPTION

Figure 1:
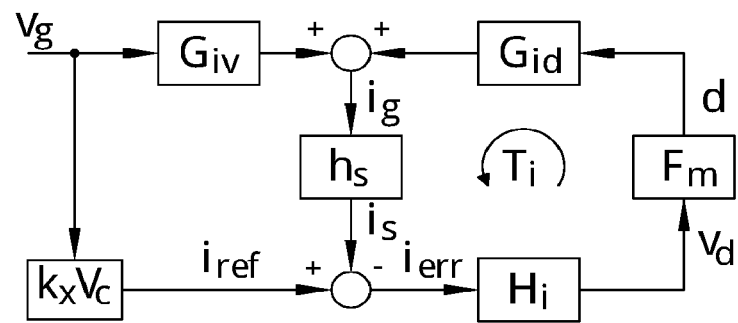
FIG. 1 is a dynamic model of a conventional power converter.

As described briefly above, conventionally, current control loops in power converters operate as modelled in FIG. 1. $G_{iv}$ and $G_{id}$ are the power stage functions and $k_xV_c$ is the current reference gain. This model will not be described in detail as it is described in the above mentioned article by Louganski and Lai. In summary, the admittance of the circuit is considered to comprise two branches. One branch draws a current in phase with the line voltage which corresponds to the load power. The other branch draws a leading phase current which is independent of the converter load and increases with line frequency for a given current loop bandwidth. This admittance component is small at low frequencies, but at higher frequencies may have a magnitude such that the two admittance phases do not cancel each other out and this can lead to zero-crossing distortion and increased harmonic content.

Proposals have been made to modify the current control loop to eliminate the cause of the leading phase distortion of the line current.

Figure 2:
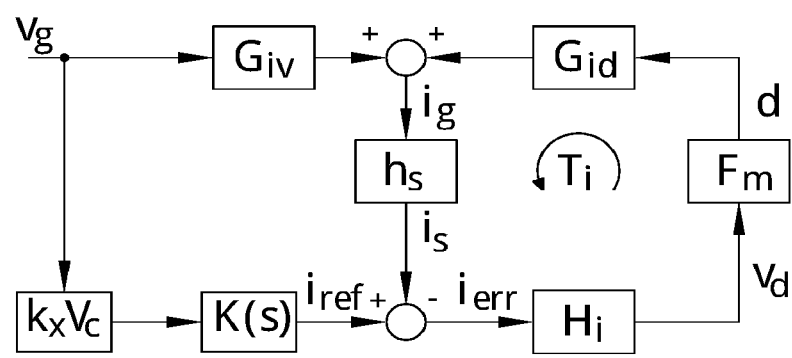
FIG. 2 is a dynamic model of a power converter with current phase lead compensation using current reference correction.

One example, as shown in FIG. 2, has been to modify the current reference signal with a gain K(s). This approach aims to compensate the effect of $Y_1(s)$ at higher frequencies using a corrective transfer function K(s). This approach was found to extend the frequency range over which there is no zero-crossing distortion.

Figure 3:
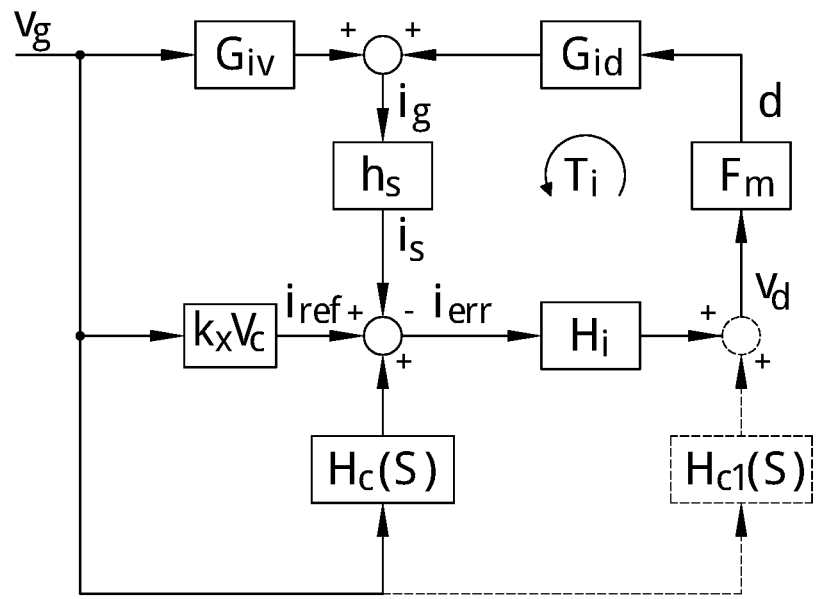
FIG. 3 is a dynamic model of a power converter using LPAC for current phase lead compensation.

A new approach to eliminate current phase lead is the LPAC method mentioned above and represented in FIG. 3. The LPAC introduces a third admittance component $Y_3(s)$ that cancels $Y_1(s)$. $Y_3(s)$ draws a current opposite to that of $Y_1(s)$ and so cancels its effects at frequencies within the current loop bandwidth. This means that the bandwidth can be increased as required to pass all harmonics of the rectified sine wave for high frequencies but without the need for the greatly increased switching frequency. The range over which there is no zero-crossing distortion is greatly increased using a function that is not load-dependent. The LPAC can be incorporated into a standard analog PFS control system as shown in FIG. 3. According to the LPAC method, a new input from the global input voltage $v_g$, with a transfer function $H_c(s)$ is introduced either at the summing junction, in order to cancel the undesired voltage term (as shown by the solid line in FIG. 3), or is introduced into the loop after $H_i(s)$ the current loop compensator transfer function—as shown by the dashed lines in FIG. 3.

The present inventors have, in a co-terminously filed application, proposed a modification of the LPAC arrangement for analog systems, in which an impedance adjustment filter is incorporated to filter the global voltage signal $v_g$. The impedance adjustment filter may be a notch filter or other suitable filter. A notch filter should be tuned to the resonance frequency of the EMI filter of the power converter. If the impedance adjustment filter is a low pass filter it should have a frequency below that of the power converter low pass filter. The frequency of the impedance adjustment filter must, however, be higher than the maximum grid or power source frequency (which can be e.g. as high as 800 Hz in e.g. aircraft applications) but should be substantially (e.g. a decade) lower than the minimum switching frequency, because the notch filter cannot affect low frequency variations in the grid, and for higher frequencies, the loop might not be able to react quickly enough.

The theory introduced in the other application behind the use of a filter to modify impedance is explained starting from the power converter modified to incorporate the LPAC circuit as described above and as shown in FIG. 3. The introduction of the LPAC function ($H_c(s)$ or $H_{c1}(s)$) enables, to a certain degree, the correction of the input impedance of the converter according to the equation:

$$Y(s) = \frac{i_g(s)}{v_s(s)} = \frac{G_{iv}(s)}{1+T_i} + \frac{G_{id}(s)F_mH_i}{1+T_i}k_xV_c - \frac{G_{id}(s)F_mH_iH_c}{1+T_i}$$

Where $G_v(s)=1/(sL)$ and $G_{id}(s)$ $V_o/(sL)$

If the LPAC transfer function is correctly designed so that $$Hc(s) = \frac{1}{V_0F_mH_i}$$

Then the first term introduced by the input inductor will be cancelled by the addition of the last term, where $H_i$ is the current controller where the high frequency pole is neglected.

Therefore, the input impedance, after LPAC, can be represented by:

$$Y(s) = \frac{i_g(s)}{v_s(s)} = \frac{G_{id}(s)F_mH_i}{1+T_i}k_xV_c$$

$V_0$ is the output of the voltage loop in the PFC and $k_x$ is the gain of the input voltage sensor, with the LPAC solution of FIG. 3.

Whilst, as mentioned above, this does improve PFC over a greater range of frequencies, the system of the present disclosure adds the possibility of modifying the input impedance of the converter as required to improve its stability. The output impedance of the power converter filter must be lower than the impedance of the supply. It is therefore necessary to damp spikes in impedance to bring the system impedance close to the supply impedance. Adding damping components or the like, however, adds to the size and weight of the power converter.

Explained in more detail, for the stability criterion to be met, the PFC power converter can be modelled as a loop such that $$V_{in}(s) = V_{th}(s)\frac{1}{1+\frac{Z_{th}(s)}{Z_{in}(s)}}$$

where $Z_{th}(s)/Z_{in}(s)$ is the ratio of impedances, $Z_{th}(s)$ being the source subsystem output impedance and $Z_{in}(s)$ being the load subsystem input impedance.

It can be seen, therefore, that for stability, the ratio of $Z_{th}$ to $Z_{in}$ must not be equal to −1. The values of $Z_{th}$ and $Z_{in}$ can, however, be varied to improve stability without adding passive components.

As can be seen from the above equation for the admittance of the LPAC PFC converter of FIG. 3, the term that modifies the impedance is $$\frac{G_{id}(s)F_mH_i}{1+T_i}k_xV_c$$

The impedance is modified, by adding a filter in the path of the input voltage sensor.

The third impedance (Y(s)) equation then becomes:

$$Y(s) = \frac{i_g(s)}{v_g(s)} = \frac{G_{iv}(s)}{1+T_i} + \frac{G_{id}(s)F_mH_i}{1+T_i}k_xV_c \, Filter^1$$

If the input is to be modified by the filter, the filter needs to have the form:

$$Filter^1 = \frac{V_0F_mH_ik_xV_c \, Filter - 1}{V_0F_mH_ik_xV_c}$$
$$= Filter - \frac{1}{V_0F_mH_ik_xV_c}$$

As can be seen, a filter stage plus an extra term is required, where this extra term is the LPAC. Therefore, the filter can be designed such that Middlebrook's criterion is met.

Figure 4:
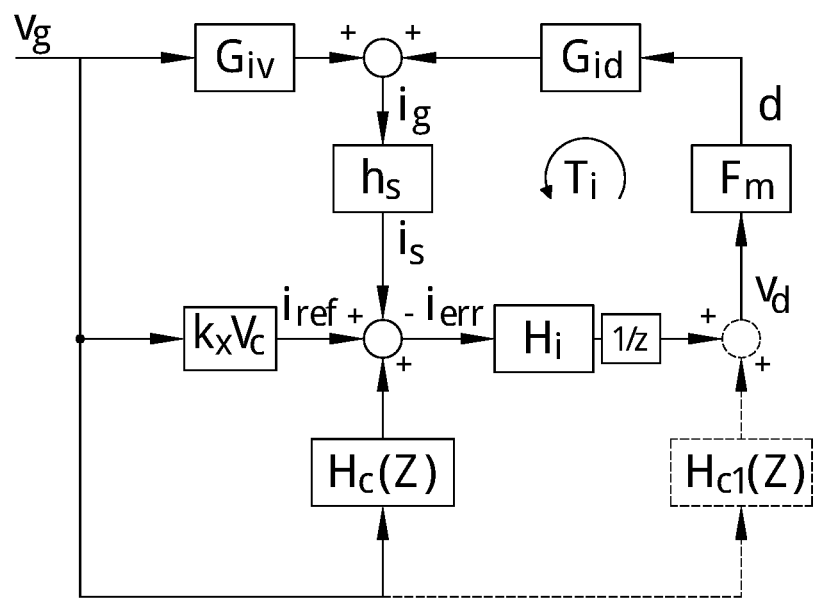
FIG. 4 is a dynamic model of a power converter using a digital implementation DLPAC for current phase lead.

In analog control LPAC implementations, there is no significant computational delay and any propagation delay is sufficiently low to neglect. In a digital implementation, however, some computational delay, or delay caused by analog to digital conversion, is introduced as represented in FIG. 4. As represented in this figure, there will always be a minimum of one unit delay and this will not allow the full cancellation of the input inductor related component using LPAC, so limiting input impedance shaping.

Therefore, because where the control is digital, a time delay is introduced (represented by 1/z in FIG. 4), the third impedance equation, set out above for the analog control, becomes, in the discrete domain, with the digital delay:

$$Y(z) = \frac{i_g(z)}{v_g(z)} = \frac{G_{iv}(z)}{1+T_i} + \frac{G_{id}(z)F_mH_i}{1+T_i}\frac{1}{z}k_xV_c - \frac{G_{iv}(z)}{1+T_i}\frac{1}{z}$$

It can be seen that the delay 1/z does not affect the inductor impedance component as the delay is intrinsic to the controller. Therefore, using LPAC as it is used to modify impedance for analog systems, full cancellation of the two terms cannot be achieved with digital systems.

Figure 5:
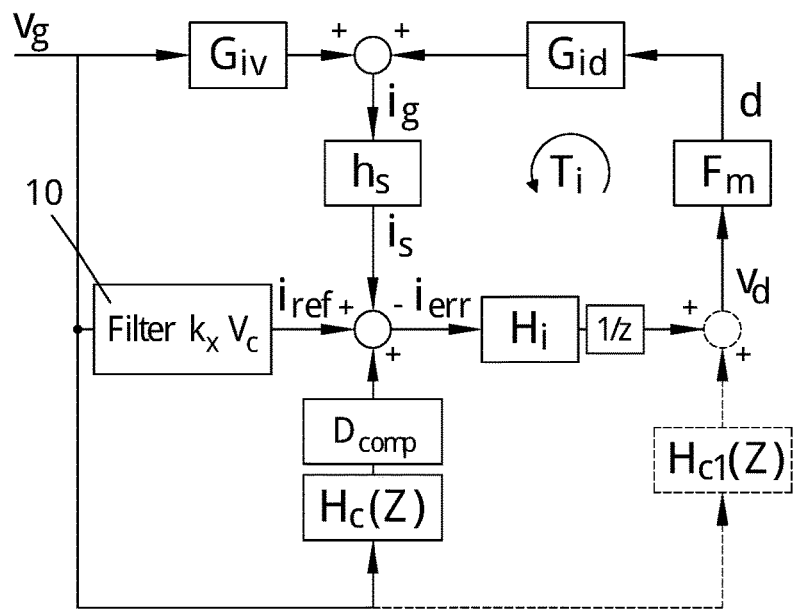
FIG. 5 is a dynamic model of a power converter using a digital implementation DLPAC for current phase lead cancellation, Put modified according to the present disclosure to modify the input impedance at certain frequencies.

The delay introduced by the digital controller cannot be removed or cancelled. It is therefore necessary to modify the filter to compensate for the delay. Therefore, the present solution involves the addition of a filter to modify the input impedance using DLPAC and also to add delay compensation $D_{comp}$ as seen in FIG. 5.

$$Y(z) = \frac{i_g(z)}{v_g(z)} = \frac{G_{iv}(z)}{1+T_i} + \frac{G_{id}(z)F_mH_i}{1+T_i}k_xV_c - \frac{G_{iv}(z)}{1+T_i}\frac{1}{z}D_{comp}$$

Figure 6:
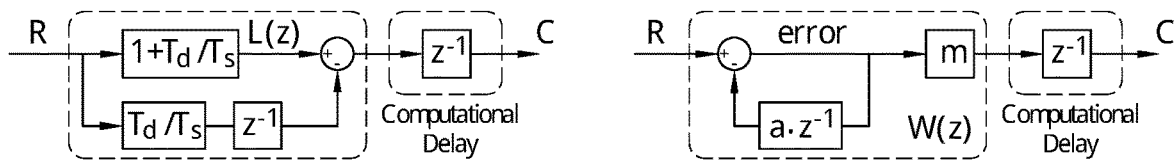
FIG. 6 shows examples of delay compensation techniques for use with the arrangement of this disclosure.
Figure 6:
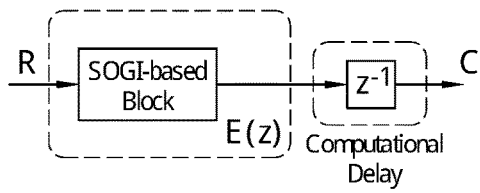
Figure 6:
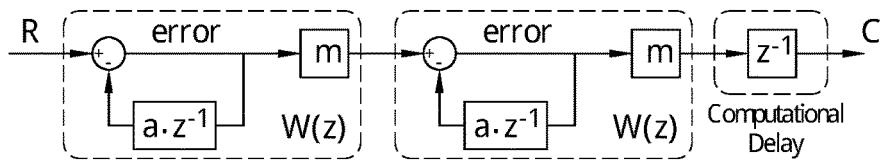

A number of possible delay compensation methods are available, some examples of which are shown in FIG. 6. It will not be possible to compensate for delay at all frequencies. For example, the filter and delay compensation may be implemented using a linear predictor, with built-in $z^{-1}$ delay, as shown in FIG. 6(a).

Another method is to use a first order filter (FIG. 6 (b)) tuned in such a way that the impedance of the PFC converter can be modified at frequencies between the maximum grid frequency and a decade below the switching frequency. If the switching frequency is sufficiently high, this method may also enable damping in the EMI filter to be removed. A further improvement may be provided by using a double first order filter per unit delay in the system (shown in FIG. 6(d)).

The inventors have found that the first order filter technique is preferable below 10 kHz. The linear predictor technique cannot operate in this range. On the other hand, the effect introduced by the linear predictor can be leveraged to deal with resonances in the system's EMI filter to improve stability.

An alternative implementation uses a SOGI-based block and delay as shown in FIG. 6(c).

Lu, X. Wang, P. C. Loh, T. Dragicevic and F. Blaabjerg, 'A Comparative benchmark of digital delay compensation techniques based on a graphical approach,' 2017 IEEE Energy Conversion Congress and Exposition (ECCE), Cincinnati, OH, 2017, pp. 3044-3048, doi: 10.1109/ECCE.2017.8096557 discusses various delay compensation techniques.

Because the filter in the input voltage sensing path has no impact in the reference for the current loop, the introduction of the filter modifies the input impedance without incurring stability problems. As seen above, however, a filter alone does not work we in digital control systems because of delays in the digital system. Therefore, a delay compensation is also introduced. The use of delay compensation for digital control systems further improves stability and also improves the delay lag, thus reducing harmonic content on the input current. Stability issues in the current loop can be avoided by appropriate selection of lifter and delay compensation parameters.

The present disclosure provides a PFC control solution by which input impedance modification can be passively achieved without the need for any additional measurement and without substantially increasing the size or weight of the system. The arrangement can be implemented using a simple filter and can be applied to any PFC converter with digital control.

The invention claimed is:

1. A power factor correction circuit comprising:
a global voltage input; and
means for deriving a reference current from the global voltage, wherein the means for deriving includes first and second power stages defining two branches, a first branch drawing a current in phase with a load voltage and a second branch drawing a leading phase current, which combine to derive the reference current from the global voltage;
whereby the means for deriving the reference current comprises a digital leading phase admittance cancellation (DLPAC) transfer function and a filter, whereby the reference current is derived from a sum of an output of the DLPAC transfer function and an output of the filter; and further comprising means for compensating for delays in the DLPAC function, such that the power factor correction circuit has a closed-loop admittance transfer function of:

$$Y(z) = \frac{i_g(z)}{v_g(z)} = \frac{G_{iv}(z)}{1+T_i} + \frac{G_{id}(z)F_m H_i}{1+T_i} k_x V_c - \frac{G_{iv}(z)}{1+T_i}\frac{1}{z}D_{comp}$$

where:

$i_g$ a global current;
$v_g$ the global voltage;
$G_{iv}$ is a first power stage transfer function;
$G_{id}$ is a second power stage transfer function;
$F_m$ is a modulator gain;
$k_x$ is an input voltage gain;
$V_c$ is an output of a voltage loop in the power factor correction circuit; and
$D_{comp}$ is a delay compensation factor.

2. The circuit of claim 1, wherein the filter is a notch filter.

3. The circuit of claim 1, wherein the filter is a low pass filter.

4. The circuit of claim 1, wherein the DLPAC transfer function is provided at a summing junction with the filter.

5. The circuit of claim 1, wherein the DLPAC transfer function is provided after a current loop transfer function.

6. The circuit of claim 1, wherein the means for compensating for delays comprises a first order filter.

7. A power converter comprising a voltage input and a voltage output and a power stage between the voltage input and the voltage output, and further comprising the power factor correction circuit as recited in claim 1.

8. A method of correcting a power factor in a power converter, the method comprising performing a leading phase admittance cancellation (DLPAC) function on a global voltage input and performing a filter function on the global voltage input, and deriving a reference current resulting from the sum of the DLPAC function and the filler function, and further comprising compensating for time delays in the DLPAC function, such that the power factor correction circuit has a closed-loop admittance transfer function of:

$$Y(z) = \frac{I_g(z)}{v_g(z)} = \frac{G_{iv}(z)}{1+T_i} + \frac{G_{id}(z)F_m H_i}{1+T_i} k_x V_c - \frac{G_{iv}(z)}{1+T_i z}\frac{1}{z}D_{comp}$$

where:

$i_g$ is a global current;
$v_g$ is the global voltage;
$G_{iv}$ is a first power stage transfer function;
$G_{id}$ is a second power stage transfer function;
$F_m$ is a modulator gain;
$k_x$ is an input voltage gain;
$V_c$ is an output of a voltage loop in the power factor correction circuit; and
$D_{comp}$ is a delay compensation factor.

\* \* \* \* \*